(12) United States Patent
Biskeborn et al.

(10) Patent No.: US 8,675,310 B2
(45) Date of Patent: *Mar. 18, 2014

(54) EMBEDDED CHIP TAPE HEAD

(75) Inventors: Robert Glenn Biskeborn, Hollister, CA (US); James Howard Eaton, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,087

(22) Filed: Jul. 24, 2012

(65) Prior Publication Data

US 2012/0287531 A1    Nov. 15, 2012

Related U.S. Application Data

(62) Division of application No. 10/769,271, filed on Jan. 30, 2004, now Pat. No. 8,264,793.

(51) Int. Cl.
| | | |
|---|---|---|
| *G11B 5/105* | (2006.01) | |
| *G11B 5/187* | (2006.01) | |
| *G11B 5/265* | (2006.01) | |
| *G11B 15/60* | (2006.01) | |

(52) U.S. Cl.
USPC ........ 360/129; 360/121; 360/122; 360/241.1; 360/130.21

(58) Field of Classification Search
USPC .............. 360/121, 122, 129, 231, 241, 241.1, 360/130.21
See application file for complete search history.

(56) References Cited

U.S. PATENT DOCUMENTS

| | | | |
|---|---|---|---|
| 3,610,839 | A | 10/1971 | Sand |
| 3,684,841 | A | 8/1972 | Boehme |
| 3,701,859 | A | 10/1972 | Braun et al. |
| 3,969,770 | A | 7/1976 | Cavallari |
| 4,300,179 | A | 11/1981 | Barnes et al. |
| 4,649,450 | A | 3/1987 | Linke |
| 4,685,005 | A | 8/1987 | Fields, Jr. |
| 4,695,909 | A | 9/1987 | Momata et al. |

(Continued)

FOREIGN PATENT DOCUMENTS

EP    1076339 A2    2/2001

OTHER PUBLICATIONS

Non-Final Office Action Summary from U.S. Appl. No. 10/769,271 dated Sep. 25, 2006.

(Continued)

*Primary Examiner* — Craig A. Renner
(74) *Attorney, Agent, or Firm* — Zilka-Kotab, PC

(57) ABSTRACT

A tape drive system according to one embodiment includes a magnetic head. The magnetic head includes first and second beams each having a tape bearing surface, a face, a recess in the tape bearing surface thereof, the faces of the beams facing either towards each other or away from each other; a first chip being positioned in the recess of the first beam; and a second chip being positioned in the recess of the second beam, wherein each chip has circuitry selected from a group consisting of read elements, write elements, and combinations thereof, wherein a tape bearing surface of each chip is generally aligned with the tape bearing surface of the associated beam, and wherein an end of each chip is generally aligned with the face of the associated beam. The system also includes a drive mechanism and a controller.

16 Claims, 9 Drawing Sheets

(56) References Cited

U.S. PATENT DOCUMENTS

| | | | |
|---|---|---|---|
| 4,713,709 A | 12/1987 | Yasuda et al. | |
| 5,237,476 A | 8/1993 | Bischoff et al. | |
| 5,905,613 A | 5/1999 | Biskeborn et al. | |
| 6,097,570 A * | 8/2000 | Dee | 360/121 |
| 6,341,416 B1 | 1/2002 | Biskeborn et al. | |
| 6,577,470 B1 | 6/2003 | Rumpler | |
| 6,611,398 B1 * | 8/2003 | Rumpler et al. | 360/129 |
| 6,639,753 B1 * | 10/2003 | Henze et al. | 360/121 |
| 6,690,542 B1 * | 2/2004 | Wang | 360/129 |
| 6,778,359 B1 * | 8/2004 | Iwama | 360/129 |
| 8,264,793 B2 | 9/2012 | Biskeborn et al. | |
| 2002/0041466 A1 * | 4/2002 | Tobitsuka et al. | 360/129 |
| 2002/0118489 A1 | 8/2002 | Lam | |
| 2002/0167758 A1 | 11/2002 | Kennedy et al. | |
| 2003/0016474 A1 * | 1/2003 | Biskeborn | 360/121 |
| 2003/0039045 A1 | 2/2003 | Biskeborn | |
| 2003/0076631 A1 | 4/2003 | Torline et al. | |
| 2003/0179499 A1 * | 9/2003 | Shinjo et al. | 360/129 |
| 2004/0223261 A1 * | 11/2004 | Deshpande et al. | 360/234.7 |
| 2005/0128640 A1 * | 6/2005 | Biskeborn et al. | 360/129 |
| 2005/0168874 A1 | 8/2005 | Biskeborn et al. | |

OTHER PUBLICATIONS

Restriction/Election Requirement from U.S. Appl. No. 10/769,271 dated Jun. 5, 2007.
Final Office Action Summary from U.S. Appl. No. 10/769,271 dated Mar. 17, 2008.
Examiner's Answer from U.S. Appl. No. 10/769,271 dated Oct. 31, 2008.
Decision on Appeal from U.S. Appl. No. 10/769,271 dated Jan. 30, 2012.
Notice of Allowance and Fee(s) Due from U.S. Appl. No. 10/769,271 dated May 3, 2012.

* cited by examiner

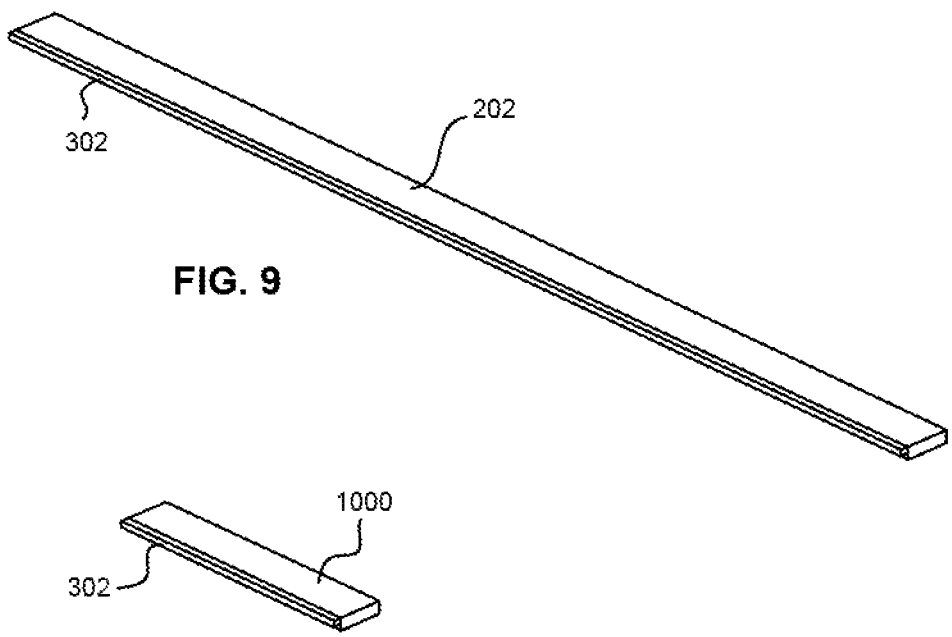
FIG. 9
FIG. 10
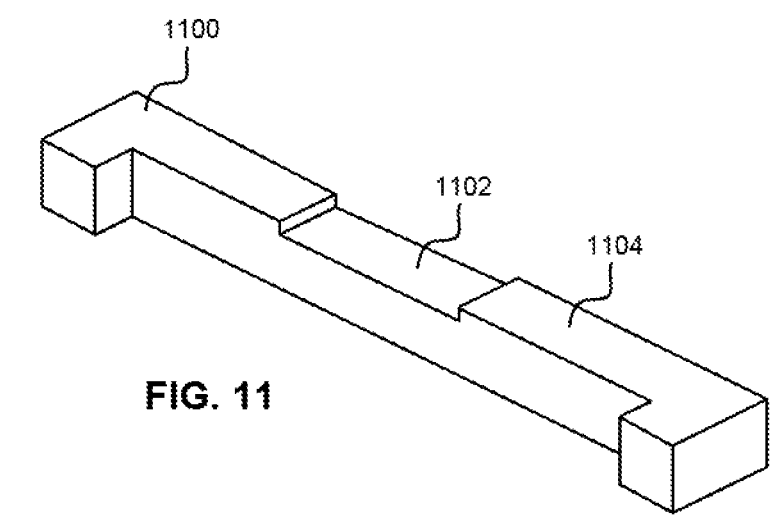
FIG. 11

EMBEDDED CHIP TAPE HEAD

RELATED APPLICATIONS

This application is a divisional of U.S. patent application Ser. No. 10/769,271, filed Jan. 30, 2004, which is herein incorporated by reference.

BACKGROUND

The present invention relates to magnetic heads, and more particularly, this invention relates to a magnetic head having embedded chips each containing read and/or write elements.

Many modern electronic components are created by thin film wafer processing. One category of component created by thin film processing is the tape head. Another category is the disk head.

Most tape heads are currently built on wafers using thin film processes, similar to the wafers used for fabricating disk heads. However, the operating efficiency of disk heads and tape heads are inherently different. Disk recording/reading is very efficient, as the disk media is extremely flat and smooth, has a very thin magnetic layer, is in a sealed environment, and the heads are constructed to function with a particular media. Writing and reading tapes must address very different challenges. For example, the head must work with different tape brands, which can have different physical and magnetic properties. Furthermore, most tape is composed of magnetic particles, which are coated onto the tape surface. The resulting media can have variations in coating thickness and particle dispersion. This, coupled with spacing loss variations due to embedded wear particles and debris, requires that magnetic bits in tape must be much larger than bits in disk media for achieving an acceptable signal-to-noise ratio. Tape bits are typically of the order of 100 times wider and 3 times longer than bits recorded onto disks. Disk drive heads are designed to fly over smooth disk surfaces in a controlled manner at speeds approaching 30 to 40 meters per second. By contrast, tape stacking and other requirements limit tape drive operating speeds to approximately 3 to 6 meters per second. Thus, to achieve data rates commensurate with disk drives, high performance linear tape drives typically employ heads having multiple pairs of write-read heads that operate simultaneously. For example, two pairs provide twice the data rate of one pair, and Linear Tape Open (LTO) heads have eight pairs of read and write elements for each direction.

Often in tape head fabrication, head images are laid out on the wafer such that the heads cut from the wafer are the required length for insertion in a tape drive. However, for LTO heads for example, the active area of the head is approximately 7 mms long, whereas the tape supporting surface of the head must be 23 mm long. The remaining 16 mm are blank, i.e. devoid of devices.

A problem is that thin film wafers are of a standardized size, and thus, the number of individual dies which contain the read/write recording devices that can be cut from each wafer is limited. Increasing use of more complex wafer processes, coupled with the high cost of wafer substrates makes achieving the highest number of heads possible from a single wafer an important head design priority.

An approach to increasing the number of dies per wafer is to make each die no larger than the active area needed for each head, Thus, for example, three partial span images can fit in the space of one full span LTO image. The dies are fabricated into chips which are then inserted into a passive carrier constructed of similar substrate material. In this way, the tape is fully supported over the width of the head, but wafer costs are dramatically reduced. Partial span heads are conventionally fabricated such that the closure portion of the head is completely surrounded by the carrier. The entire structure, including head and carrier, are machined together to form a uniform tape bearing surface, which is planer or cylindrical and has no steps, discontinuities or corners. Thus, the carrier fully encompasses the original chip and the seam between the chip and carrier are not discontinuous. This approach generally mandates that the chip image be tall enough for mechanical processing as well as provide enough material for forming the contour. This takes away wafer space, resulting in fewer chips per wafer, etc.

A second method is to fabricate the partial span chip, i.e. lap it, etc., so that its tape bearing surface is completed prior to assembly. This otherwise finished chip is then attached to a beam such that the tape bearing surfaces of both chip and beam has minimal discontinuities. Also, the closure portion of the chip is aligned with an inner surface of the beam to eliminate any discontinuities along the edge of the tape bearing surface. The object of this method is to make the chip and beam form as closely as possible a single, regular surface, even though in general there will be steps at the chip edges. This approach allows short partial span images, so wafer utilization is good. However, a problem inherent in this method is that it is difficult to assemble the chip and beam with near-perfect alignment at the tape bearing surface. It is also more difficult to attach a cable since the contacts are now recessed from the side of the beam, and conventional cable bonding tooling does not easily reach into the recess. It would be desirable to create a partial span head in order to obtain a high utilization of useful circuitry per wafer, thereby minimizing fabrication costs and decreasing the cost per unit of magnetic heads. It would also be desirable to avoid having to provide the head contour after the chip is cut from the wafer, as required by current partial span heads, as this not only forces the use of a taller image for handling purposes, it also makes stripe and throat height control more difficult.

BRIEF SUMMARY

A tape drive system according to one embodiment includes a magnetic head. The magnetic head includes first and second beams each having a tape bearing surface, a face, a recess in the tape bearing surface thereof, the faces of the beams facing either towards each other or away from each other; a first chip being positioned in the recess of the first beam; and a second chip being positioned in the recess of the second beam, wherein each chip has circuitry selected from a group consisting of read elements, write elements, and combinations thereof, wherein a tape bearing surface of each chip is generally aligned with the tape bearing surface of the associated beam, and wherein an end of each chip is generally aligned with the face of the associated beam. The system also includes a drive mechanism for passing a magnetic recording tape over the magnetic head; and a controller electrically coupled to the magnetic head for controlling a voltage of the conducting circuit of the magnetic head.

BRIEF DESCRIPTION OF THE SEVERAL VIEWS OF THE DRAWINGS

For a fuller understanding of the nature and advantages of the present invention, as well as the preferred mode of use, reference should be made to the following detailed description read in conjunction with the accompanying drawings.

FIG. 9 is a perspective view of a row cut from a wafer.

FIG. 10 is a perspective view of a chip cut from a row.

FIG. 11 is a perspective view of a U-beam to which a chip will be coupled.

DETAILED DESCRIPTION

The following description is the best embodiment presently contemplated for carrying out the present invention. This description is made for the purpose of illustrating the general principles of the present invention and is not meant to limit the inventive concepts claimed herein.

The present invention provides a method and mechanism for slicing a thin film wafer to form such things as tape head components. A thin film wafer can be any type of composite or composition capable of containing circuitry therein, and includes semiconductor wafers.

Figure 1:
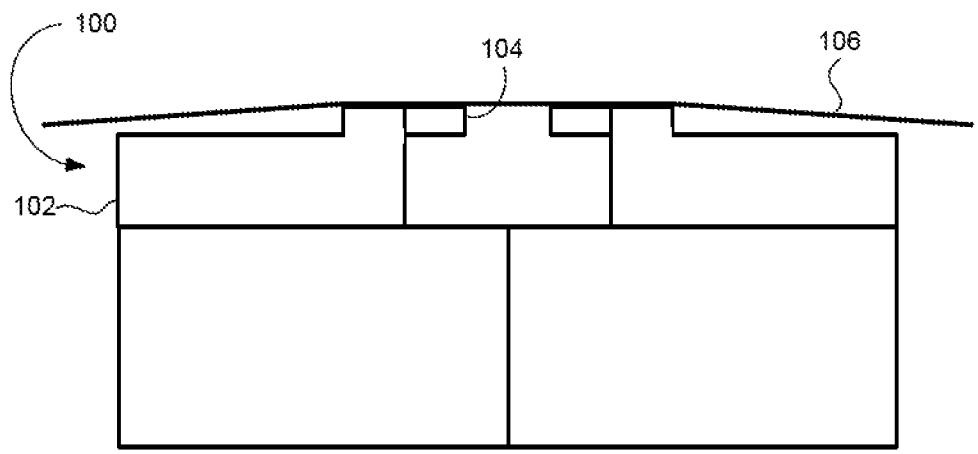
FIG. 1 is a side view of a tape head having closures.

One category of component created by thin film processing is the tape head. FIG. 1 depicts one such tape head 100. The head 100 consists of a pair of head portions 102, each having a closure 104 that engages the tape 106 as it passes over the tape bearing surface of the head 100. The tape bearing surfaces angle upwardly (towards the tape) so the tape wraps both substrate and closure edges.

The invention according to a preferred embodiment is a magnetic head comprised of a partial span flat or contoured head "chip," the chip being embedded in a flat or contoured beam, such that the chip closure extends beyond the beam edges. This is related to the partial span design, as previously patented by the present inventors, and has the same advantages, chief of which is more chips per wafer. Additional fabrication and cost benefits are achieved with the extended closure.

Figure 2:
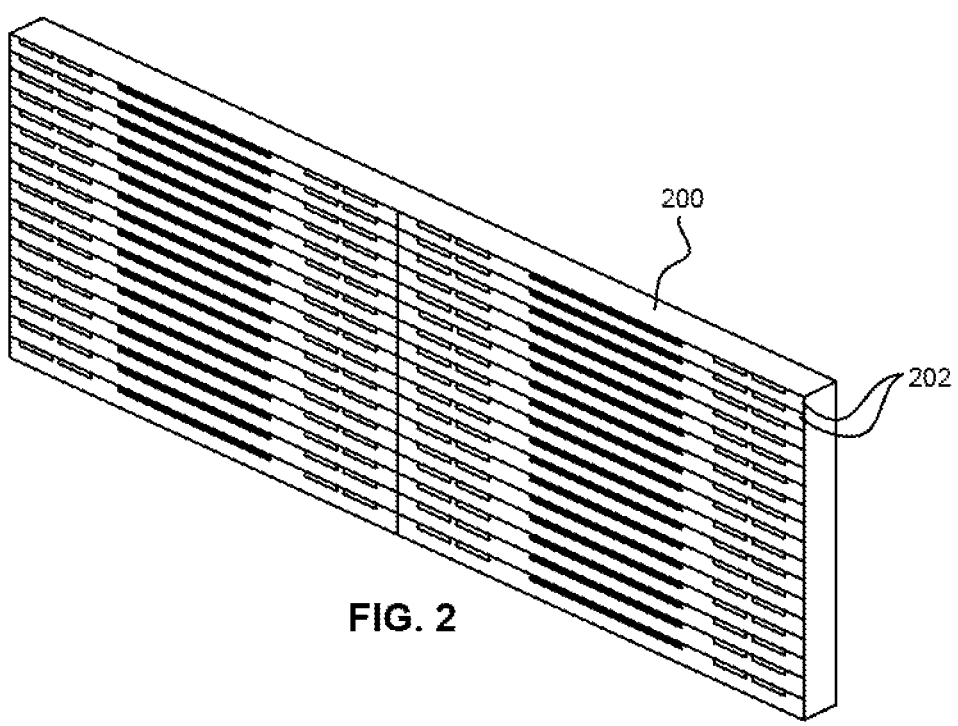
FIG. 2 is a perspective view of a section of a thin film wafer according to one embodiment.

According to the preferred method for forming the head, a wafer containing multiple "chips" each having read and/or write circuitry is formed by traditional thin film processing. The thin film wafer is cut into rectangular sections, sometimes called quads. FIG. 2 illustrates a section 200 of a thin film wafer according to one embodiment. As shown, the section 200 includes a plurality of rows 202 of circuitry that will eventually be sliced and diced to form a head or die. Each row 202 can contain multiple head images. Thus, while each row contains two head images in this figure, rows built according to this invention will generally have six head images.

Figure 3:
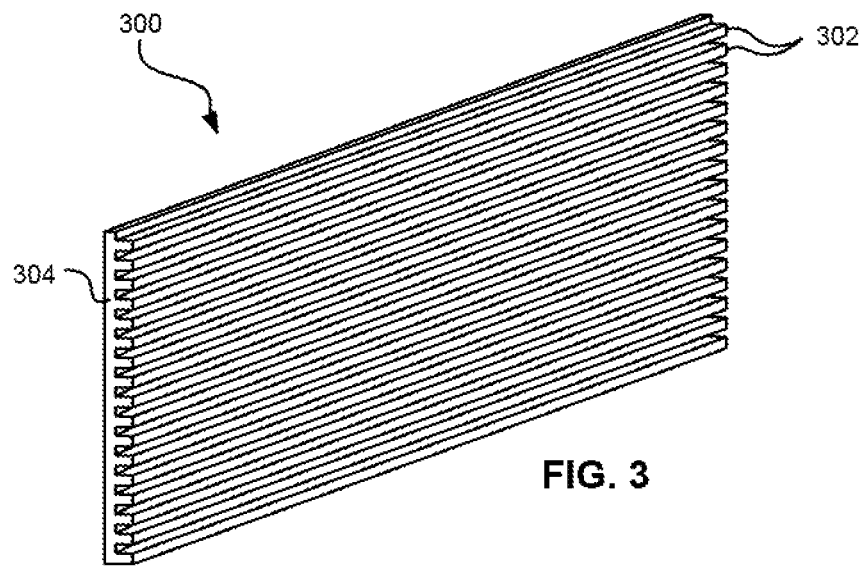
FIG. 3 is a perspective view of an array of closures.
Figure 4:
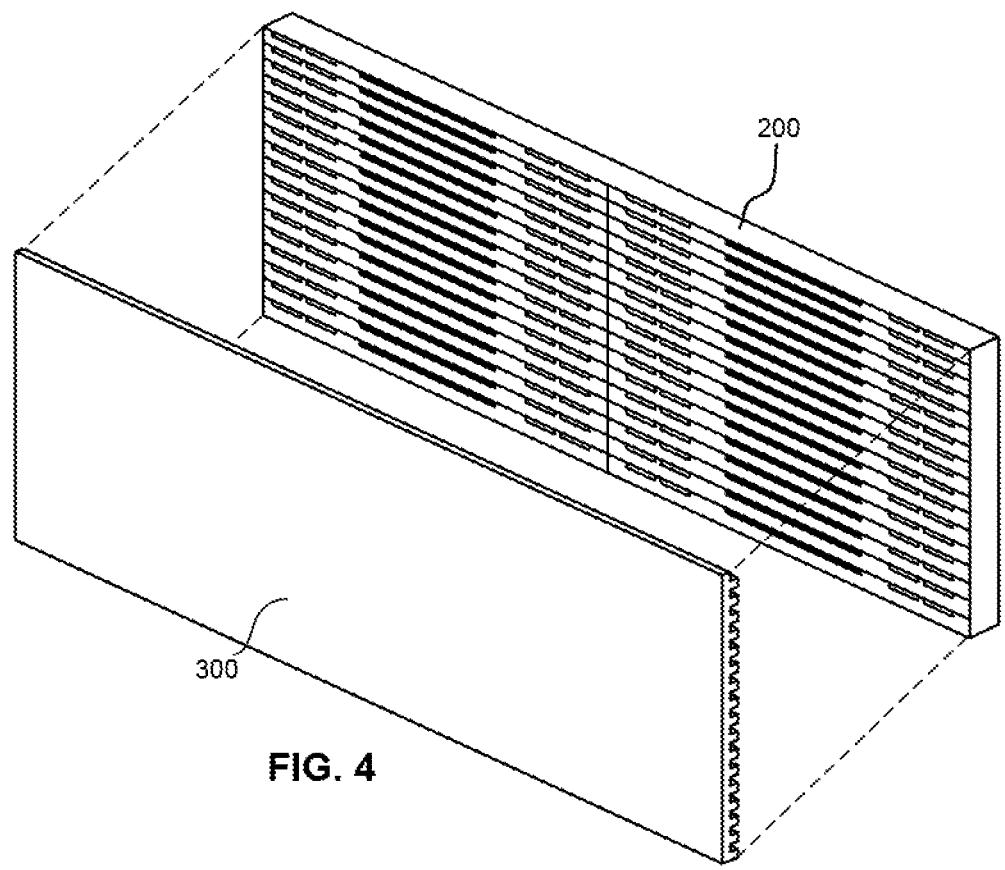
FIG. 4 is a perspective view depicting coupling of the array of closures to the section of wafer.

FIG. 3 shows an array 300 of closures 302 that will be bonded to a section 200 of the wafer. FIG. 4 illustrates how the array 300 is bonded to a section 200.

Figure 5:
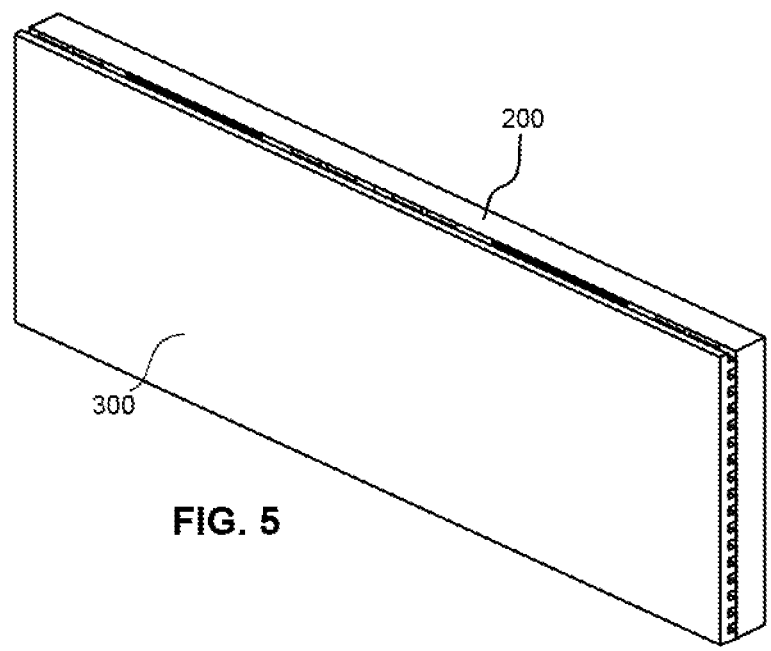
FIG. 5 is a perspective view of the array of closures coupled to the section of wafer.
Figure 6:
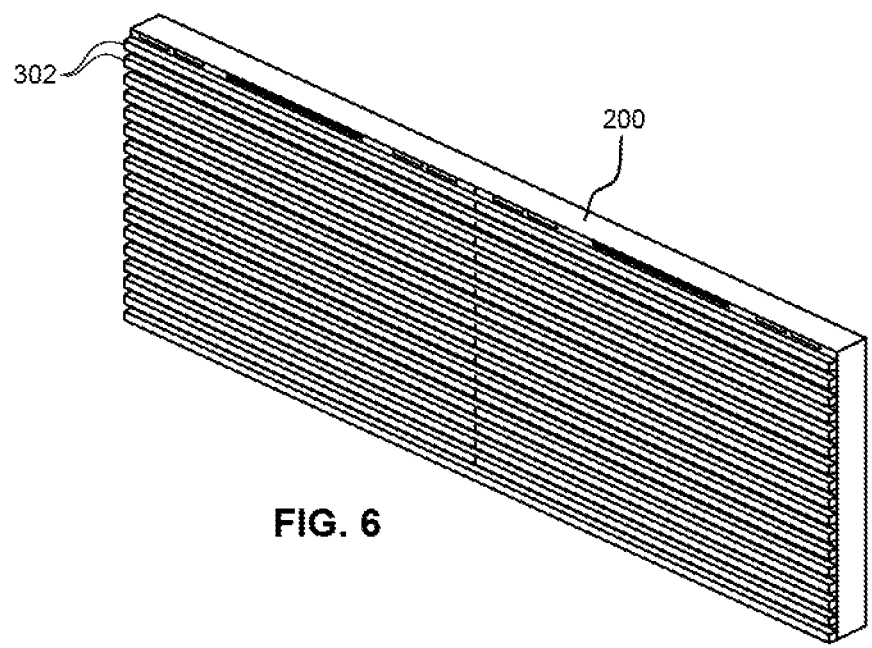
FIG. 6 is a perspective view of the closures coupled to the section of wafer upon removing a top portion of the array.

FIG. 5 depicts the array 300 of closures 302 bonded to the section 200 of wafer. A top portion 304 of the array 300 of closures 302 may be removed prior to slicing the section 200 into rows 202. See FIG. 3. Grinding may be used to remove the top portion 304 of the array 300. FIG. 6 shows the closure 302 and section 200 with the top portion 304 of the array 300 of closures 302 removed. The portions of the closure 302 remaining after processing support the tape as the tape passes over the head to protect the delicate electronics in the head from wear, similar to the way the tape 106 engages the head 100 shown in FIG. 1. Next, the row on the end of the miniquad may be lapped to give the final tape bearing surface.

Figure 7:
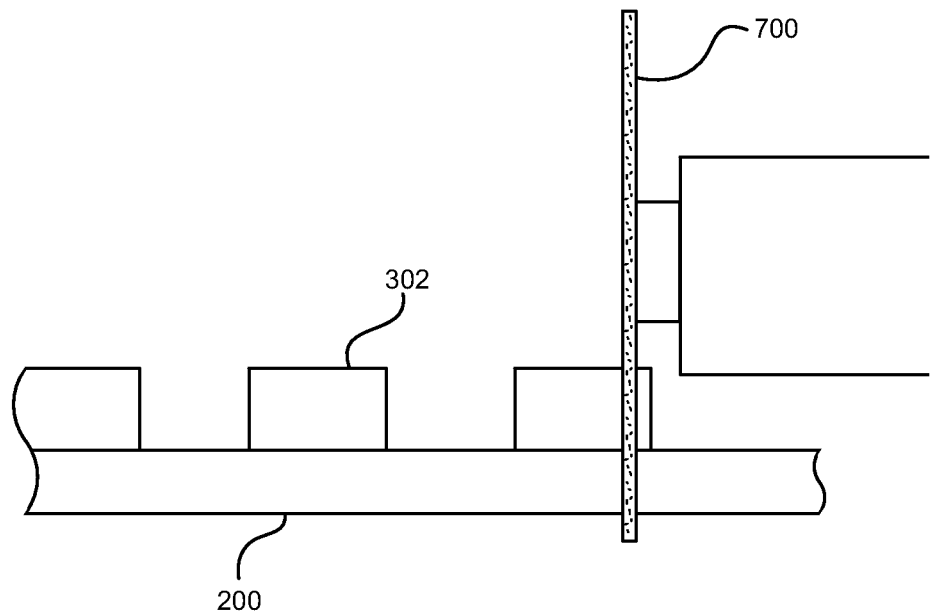
FIG. 7 is a side view depicting cutting of a row from a section of wafer.

As shown in FIG. 7, a blade 700 is used to slice rows from each section 200 by cutting through the closure 302 and section 200 such that opposite sides of the blade 700 engage an equal surface area of the closure 302. In other words, the blade 700 fully engages the closure 302.

A way to ensure that blade 700 engages equal surface areas of the closure 302 is to increase the size of the closure 302 such that the closure 302 overlaps the kerf completely. For example, if sawing is performed with a 120 micron blade 700, the closure 302 should cover about a 150 micron kerf (120 micron cutting width plus 50 microns to allow for deviation).

Figure 8:
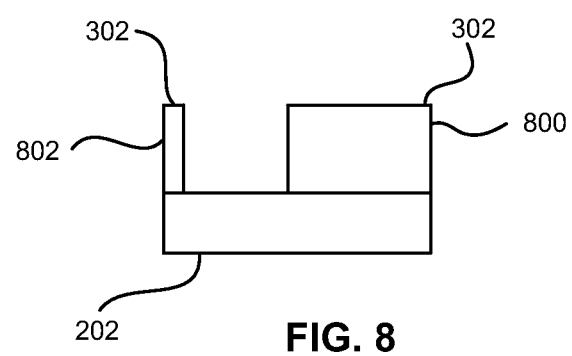
FIG. 8 is a side view of a row cut from a wafer.

FIG. 8 illustrates a row sliced from the section 200. Upon slicing, two pieces of closure material remain coupled to the row. One portion 800 of the closure material is desired and will function to engage the tape when the row is placed in a tape head. The other portion 802 of the closure material, referred to as a sliver 802, is removed.

FIG. 9 shows a row after the sliver 802 is removed. The rows are then diced into individual partial span heads, or "chips" 1000, using traditional methods. See FIG. 10, which illustrates a partial span flat profile chip 1000 according to a preferred embodiment. If the chip is to be used in an LTO head, the preferred length of the chip in a direction perpendicular to the direction of tape travel thereover is preferably less than about 7 to 8 mm, though larger sizes may be created as well.

FIG. 11 illustrates a flat profile beam (carrier) 1100 according to a preferred embodiment. One skilled in the art will understand that many different shapes of the beam can be used. For instance, the beam could be block shaped, i.e., have a generally rectangular cross section when viewed from the tape bearing surface. The beam could also include rounded and/or tapered portions. For simplicity and ease of understanding, the following description will be described with reference to a U-shaped beam, or U-beam.

With continued reference to FIG. 11, the U-beam 1100 has a recess 1102 extending into a tape bearing surface 1104 thereof. The U-beam is preferably, formed from a blank piece of wafer stock, which is inexpensive to fabricate, but is long enough to fully support the tape. If the U-beam is to be used in an LTO head, the preferred length of the U-beam in the same plane as but in a direction perpendicular to the direction of tape travel thereover is preferably less than about 50 mm, and ideally less than about 25 mms but may be longer. Before the chip is affixed to the U-beam to form the module, the tape bearing surface on one of the U-beams may be lapped or polished to form a smooth tape bearing surface thereon. Alternatively, the chip may be affixed to the U-beam and then the two lapped together to achieve the required stripe height.

Figure 12:
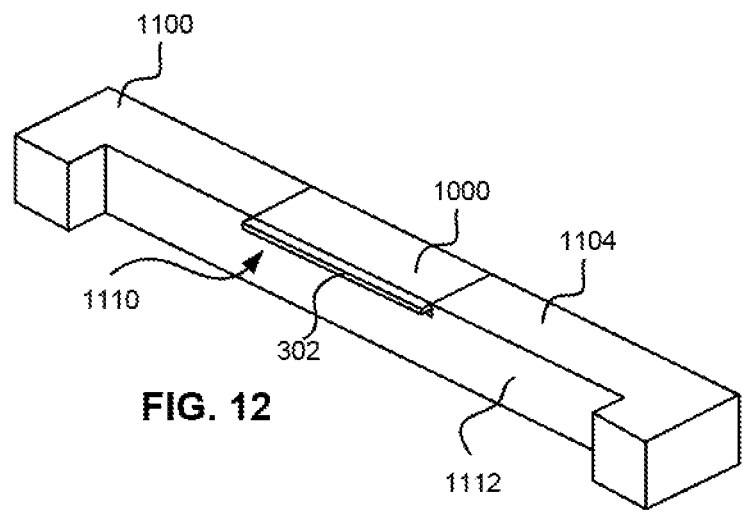
FIG. 12 is a perspective view of a U-beam with a chip coupled thereto, thereby forming a module.

As shown in FIG. 12, a chip 1000 is positioned in the recess of the U-beam such that the face 1110 of the substrate portion of the chip (which contains the device contact pads) is reasonably proximate to the adjacent face 1112 of the U-beam and coupled to the U-beam 1100 by any suitable means, such as via an adhesive, such that the chip closure extends beyond the beam edges. This forms a module, which is later used to form a complete tape head. The geometry of the chip is specifically adapted to minimize closure protrusion, and thereby minimize tape deflections effects.

The tape bearing surfaces (of the chip and U-beam) should be as parallel and coplanar as possible because the tape will run across them. However, the tape bearing surfaces do not need to be perfectly coplanar, as this design provides some tolerance for misalignment, as will be described below. Thus, the chip surface envelope may deviate from the tape bearing surface of the U-beam by several micrometers. This tolerance relief greatly reduces fabrication costs.

Two modules can be coupled together to form a head with spacing between the central portions of the beams, such as a head of the type shown in FIG. 1. The two modules may have different heights with respect to their tape bearing surfaces, as discussed below. While this height discontinuity may cause slight deformation of the tape, this does not damage the tape or head.

Figure 15:
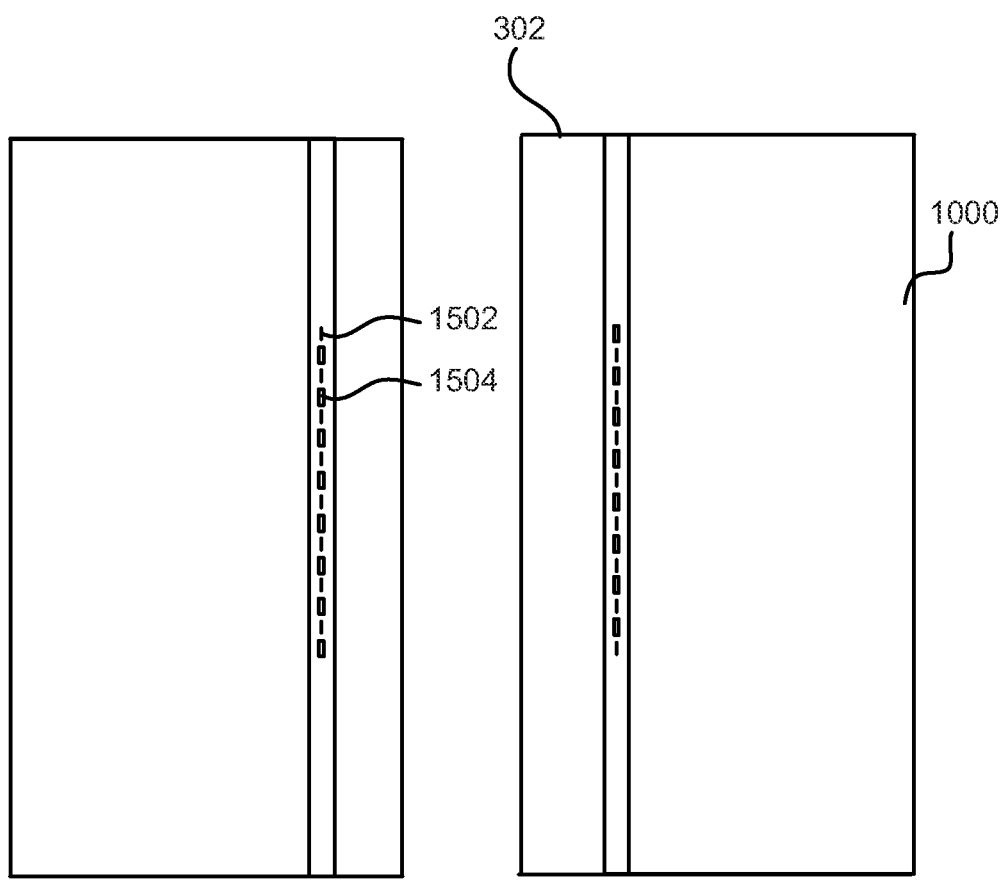
FIG. 15 is a view of the chip of FIG. 13 and an opposing module.
Figure 16:
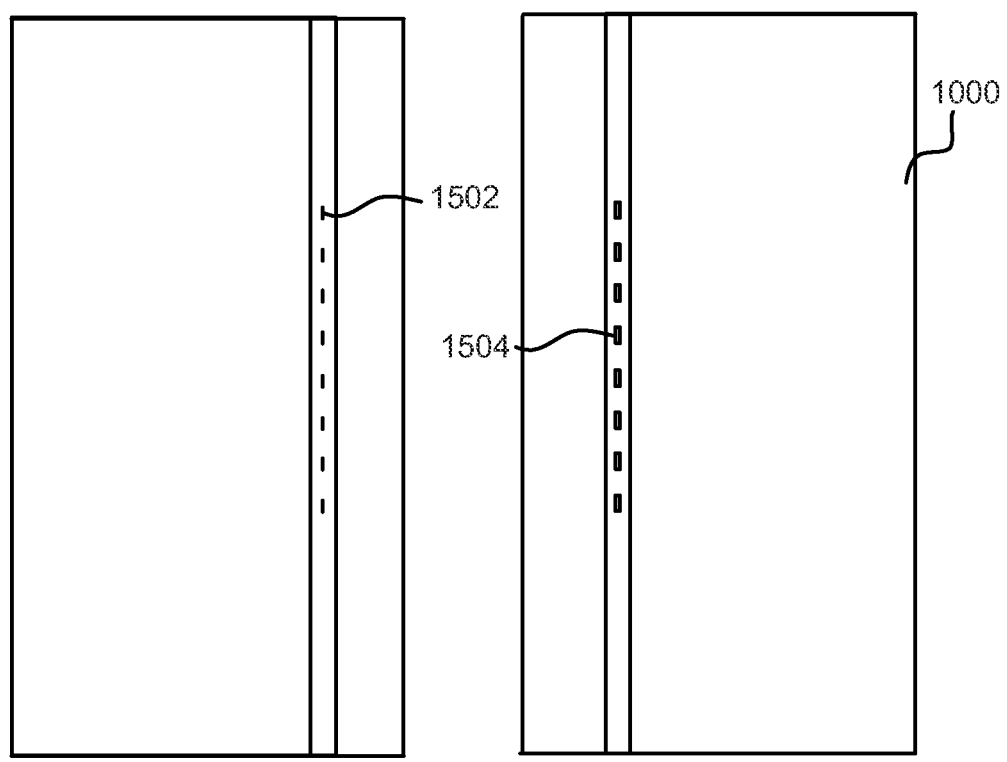
FIG. 16 is a view of opposing chips.

All of the read and/or write elements in the head are preferably positioned in the chips. Note that each chip 1000 can have multiple read and write elements, such as interleaved read/write elements 1502, 1504 as shown in FIG. 15. Alternatively, one chip can have all write elements 1504 and the other chip can have all read elements 1502, as shown in FIG. 16. Other combinations are also possible, In this way, a read/write head can be formed.

Preferably, the edges of the closures facing each other are generally spaced apart at a distance of less than about 1 mm.

Also preferably, the closures are angled upwardly into the tape bearing surface (i.e., as they approach each other, preferably at an angle between 0.1 to 2 degrees, with respect to the horizontal line between them. The angle of the closures is needed to create the required air skiving effect for close head-tape spacing.

Figure 13:
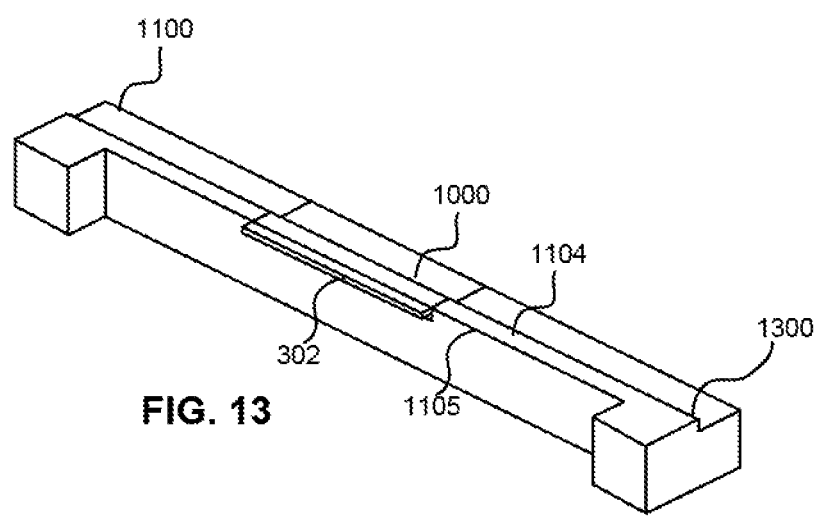
FIG. 13 is a perspective view of a module upon forming of a skiving edge thereon.

As shown in FIG. 13, the tape bearing surface of a U-beam 1100 and associated chip 1000 of a module can be processed (e.g., by grinding) to form a skiving edge 1300 thereon. Preferably skiving edges are formed on both modules to enable bi-directional reading and writing. In addition the inside edges 1105 may be made sharp so that these will also skive air. Alternatively, these may be rounded if desired.

Preferably, the wrap angle between the two modules is shallow to minimise deformations. Note however, that if the wrap angle is too shallow, the edges of the tape may curl away from the head and so jeopardize the edge reading. A preferred internal wrap angle of the tape over the closure is about 0.9 degrees (preferably less than 2 degrees) and the length of the closure is less than about 300 microns. Note however, that the head will work with higher wrap angles and longer closures.

Figure 14:
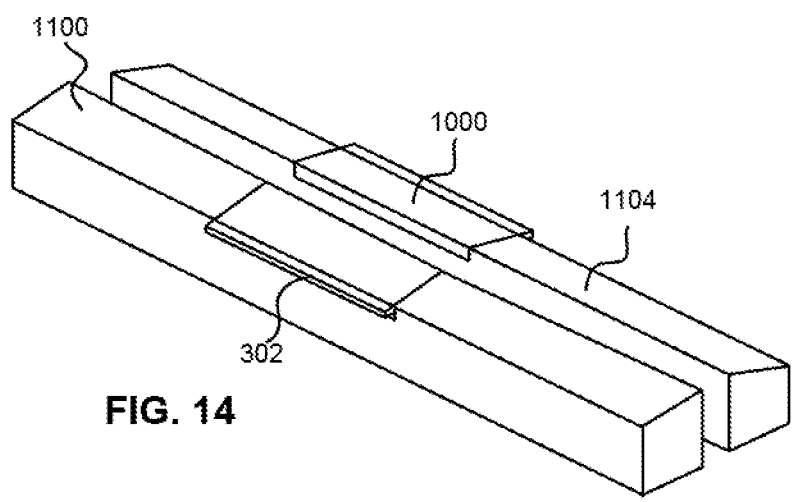
FIG. 14 is a perspective view of a head in which closures extend away from each other.

FIG. 14 illustrates an alternate embodiment in which closures 302 coupled to the chips 1000 extend away from each other. Note that the beams 1100 are shown spaced apart, but need not be spaced apart. Also, the beams 1100 and/or chips 1000 may have a curved air bearing surface 1104.

The heads created by the process and instruments described herein can be used in magnetic recording heads for any type of magnetic media, including but not limited to disk media, magnetic tape, etc.

There has thus been described a tape head that provides excellent utilization of available real estate area on wafer. The invention solves problems previously associated with manufacture of partial span heads by aligning the faces of the substrate portion of the chip and the U-beam, and so eliminating the requirement of aligning the closure and beam skiving edges.

Additional benefits of the head described herein are that it has high durability. Further, no extra provision for supporting the tape is necessary. This invention eliminates the requirements of building a head in which the closure(s) line up with other edges, such as proximate beam edges.

While various embodiments have been described above, it should be understood that they have been presented by way of example only, and not limitation. For example, the structures and methodologies presented herein are generic in their application to all types of thin film devices. Thus, the breadth and scope of a preferred embodiment should not be limited by any of the above-described exemplary embodiments, but should be defined only in accordance with the following claims and their equivalents.

What is claimed is:

1. An apparatus, comprising:
   first and second beams each having a tape bearing surface, a face, a recess in the tape bearing surface thereof, the faces of the beams facing either towards each other or away from each other;
   a first chip being positioned in the recess of the first beam;
   a second chip being positioned in the recess of the second beam;
   wherein each chip has circuitry selected from a group consisting of read elements, write elements, and combinations thereof;
   wherein a tape bearing surface of each chip is generally aligned with the tape bearing surface of the associated beam;
   wherein an end of each chip is generally aligned with the face of the associated beam;
   wherein the tape bearing surfaces of the beams are generally planar;
   wherein the recess of each beam extends from the tape bearing surface into only a portion of the beam;
   wherein each chip has a closure extending therefrom,
   wherein the closures protrude beyond portions of sides of the beams, the sides of the beams facing towards or away from each other, the portions of the beams being positioned immediately adjacent the closures.

2. The apparatus as recited in claim 1, wherein the tape bearing surfaces of the beams angle upwardly as they approach each other.

3. The apparatus as recited in claim 1, wherein each recess has a bottom surface extending along a plane oriented about parallel to a plane of the tape bearing surface of the associated beam.

4. The apparatus as recited in claim 1, wherein the first beam and the first chip are processed for forming skiving edges thereon.

5. The apparatus as recited in claim 1, wherein the closures extend towards each other.

6. The apparatus as recited in claim 1, wherein each chip has both read and write elements.

7. The apparatus as recited in claim 1, wherein each chip has interleaved read and write elements.

8. The apparatus as recited in claim 1, wherein operational elements of one of the chips are read elements, and operational elements of the other chip are write elements.

9. The apparatus as recited in claim 1, wherein the beams have a U-shape defined by a main portion and ends extending outwardly from the main portion, the ends of the first beam extending towards the ends of the second beam.

10. The apparatus as recited in claim 1, wherein the beams are each physically constructed of a single piece of material.

11. A magnetic head, comprising:
first and second beams each having a planar tape bearing surface, a face, a recess in the tape bearing surface thereof, the faces of the beams facing either towards each other or away from each other;
a first chip being positioned in the recess of the first beam; and
a second chip being positioned in the recess of the second beam;
wherein each chip has circuitry selected from a group consisting of read elements, write elements, and combinations thereof;
wherein a tape bearing surface of each chip is generally aligned with the tape bearing surface of the associated beam;
wherein each chip has a closure extending therefrom, each closure forming a contiguous portion of the tape bearing surface of the associated chip,
wherein the closure protrudes beyond the face of the associated beam,
wherein the recess of each beam extends from the tape bearing surface into only a portion of the beam,
wherein each recess has a bottom surface extending along a plane oriented about parallel to a plane of the tape bearing surface of the associated beam.

12. The head as recited in claim 11, wherein the first beam and the first chip have skiving edges thereon.

13. The head as recited in claim 11, wherein the closures extend towards each other.

14. The magnetic head as recited in claim 11, wherein the closures protrude beyond portions of sides of the beams, the sides of the beams facing each other, the portions of the beams being positioned immediately adjacent the closures.

15. The magnetic head as recited in claim 11, wherein the beams have a U-shape defined by a main portion and ends extending outwardly from the main portion, the ends of the first beam extending towards the ends of the second beam.

16. A system, comprising the magnetic head of claim 11, wherein the tape bearing surfaces of the beams angle upwardly as they approach each other.

* * * * *